United States Patent Office 3,538,405
Patented Nov. 3, 1970

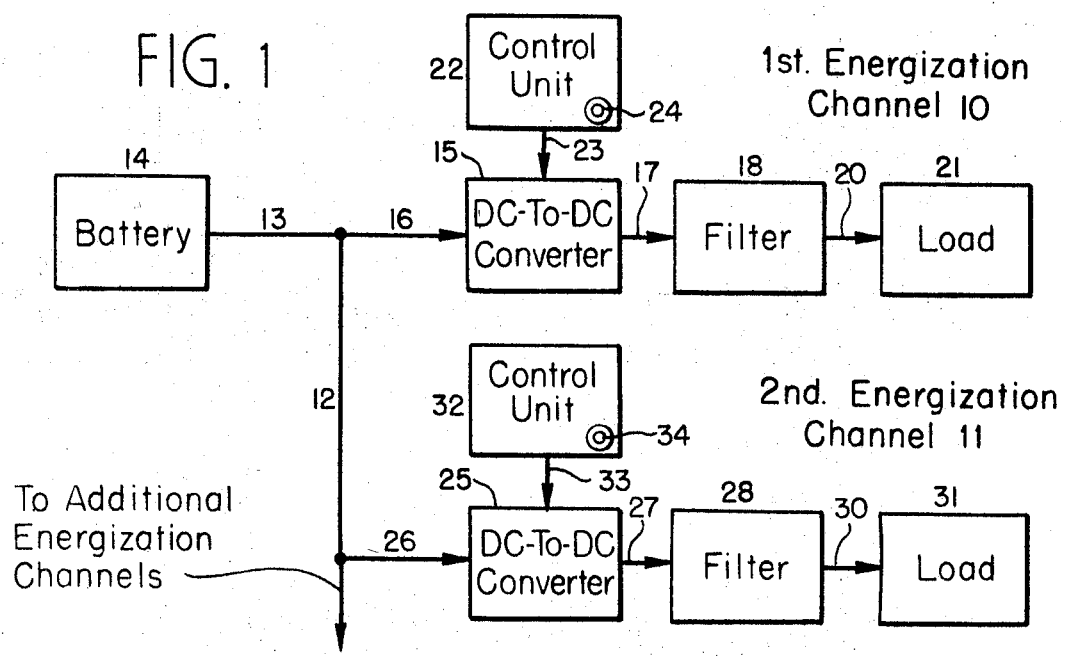
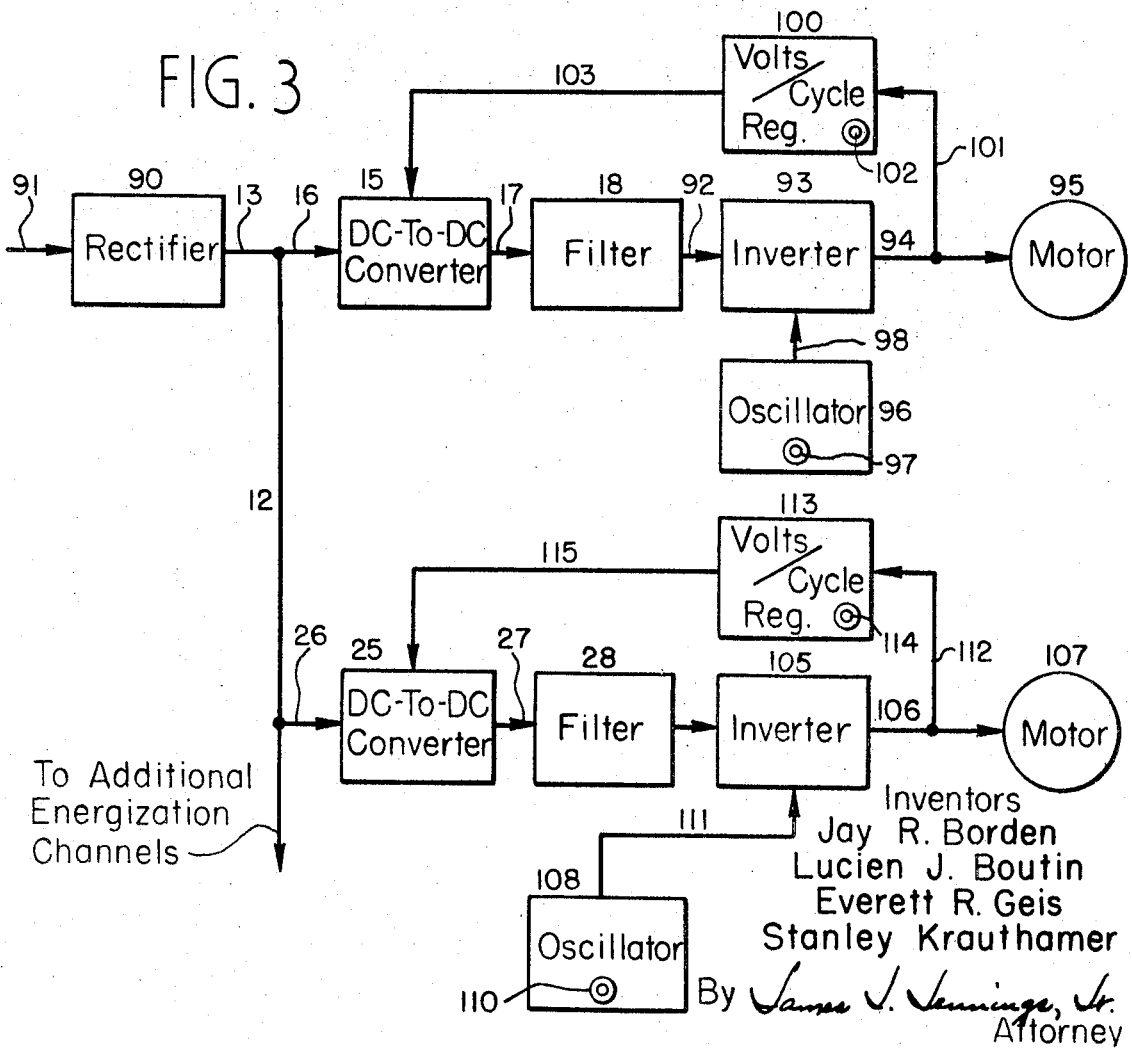

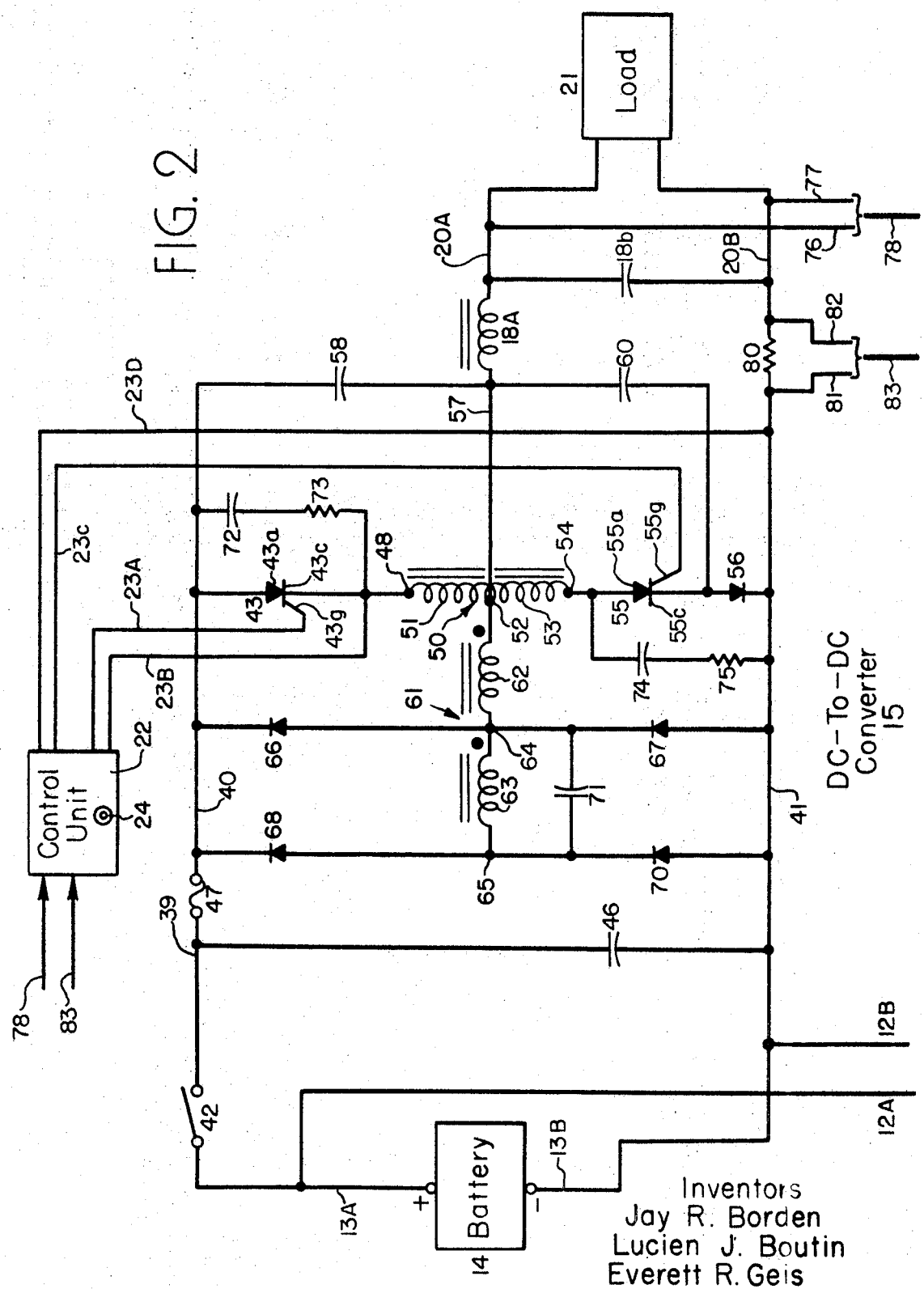

3,538,405
PARALLEL ENERGIZATION CHANNELS WITH DC-TO-DC CONVERTER IN EACH CHANNEL
Jay R. Borden, Santa Ana, Calif., Lucien J. Boutin, Alexandria, Va., and Everett R. Geis, Orange, and Stanley Krauthamer, Monterey Park, Calif., assignors to Borg-Warner Corporation, Chicago, Ill., a corporation of Delaware
Filed Feb. 26, 1968, Ser. No. 708,376
Int. Cl. H02j 1/10; H02p 7/68
U.S. Cl. 318—67      2 Claims

ABSTRACT OF THE DISCLOSURE

A common D-C supply bus receives energy from a D-C input circuit, and passes the D-C energy over the bus to a plurality of energization channels. Each channel includes a DC-to-DC converter, at least one of which is connected to pass D-C energy both in one direction through a filter to a load, and in the opposite direction from the filter back to the D-C bus.

BACKGROUND OF THE DISCLOSURE

In the energization of a plurality of electrical loads over parallel-connected energization channels, it is sometimes convenient to supply all the different channels from a common D-C bus. In turn this bus can be supplied from a battery, rectifier, fuel cell or other input circuit which provides the requisite unidirectional energizing potential difference. Manifestly the level of the energy supplied along the bus is at one constant level. If at least one load is active—for example, an electromechanical unit such as a motor—it may function temporarily as a generator and supply voltage at a level above the voltage level on the common D-C bus. Conventionally such operation only wastes the voltage produced by the active load. Previously there has been no feasible way to recover the energy actually produced by such a load, and feed it backward through the same channel including a DC-to-DC converter, for passage over the common D-C bus to supply the instantaneous energy demand in another energization channel. It is therefore toward the production of such an efficient system, in which excess energy can be fed backward through any energization channel and along the common D-C bus to supply a second channel, that the present invention is principally directed.

SUMMARY OF THE INVENTION

In accordance with the present invention a system is provided to energize a plurality of electrical loads through respective parallel-coupled energization channels. A common D-C supply bus is fed from a battery, rectifier, thermoelectric generator, fuel cell or other suitable means for supplying D-C energy to the bus. The system includes a first energization channel with a DC-to-DC converter, having a capability to pass D-C energy in either direction, coupled to the D-C bus. A filter is coupled between the DC-to-DC converter and a load which is supplied with the D-C energy passed through the converter. A volts-per-cycle regulator, having adjusting means for presetting the desired volts-per-cycle ratio of energy passed to the first A-C motor, is connected to regulate operation of the DC-to-DC converter and correspondingly regulate the level of the voltage which energizes the load. The system includes at least one other energization channel, likewise having a DC-toDC converter coupled to the common D-C bus, and a similarly connected filter, load, and control unit. This second converter, unlike the first, need not be capable of passing D-C energy in both directions. If the energy utilization requirements of the load in the first channel should diminish, or if the first load temporarily becomes a generator or supply unit, the excess energy is fed backward through the filter and two-way DC-to-DC converter in the first channel, along the common D-C bus, and into the DC-to-DC converter of the second channel. Accordingly the excess energy is not wasted but utilized to supply the instantaneous demand of the other channel or channels.

The invention is similarly applicable to a system in which the load is an A-C load, such as an induction motor, with an inverter coupled in each energization channel between the filter and the motor. With "spillover" diodes in the inverter circuit to complete a path for two-way energy passage through the inverter, excess energy produced by an overhauling motor can be passed backward through the inverter, filter, and DC-to-DC converter to the D-C supply bus for utilization to supply the instantaneous demand in another portion of the system.

THE DRAWINGS

The features of the present invention which are believed to be novel are set forth with particularity in the appended claims. The organization and manner of operation of the invention may best be understood by reference to the following description taken in connection with the accompanying drawings, in the several figures of which like reference numerals identify like elements, and in which:

FIG. 1 is a block diagram illustrating a system constructed in accordance with the principles of the present invention to supply D-C loads;

FIG. 2 is a schematic diagram depicting in detail portions of the system shown generally in FIG. 1; and FIG. 3 is a block diagram depicting the applicability of the inventive principles in a system for supplying A-C loads.

General system arrangement: FIG. 1

In FIG. 1 a pair of parallel-coupled energization channels 10 and 11 are shown coupled to a common D-C bus 12 which in turn is connected to receive input D-C energy over an input circuit 13. In the illustrated embodiment a battery 14 supplies unidirectional energy over an input circuit 13 to bus 12, but any suitable source of energy such as a thermoelectric generator, a rectifier circuit, fuel cell or other unit can be connected to supply energy to bus 12.

First energization channel 10 includes a DC-to-DC converter 15 coupled over line 16 to the D-C bus 12. In the block showing of FIG. 1 each line or conductor representation (such as 12, 13 or 16) may actually represent a plurality of electrical conductors, but the simplified showing is sufficient to depict the distribution of energy. Converter 15 is of a type which can pass D-C energy received from bus 12 over line 17, filter 18, and line 20 to load 21 to energize the load, and likewise can pass energy backward from the load to line 16 and the D-C bus 12. A control unit 22 is connected to apply suitable control signals over line 23 to converter 15, regulating the operation of the converter and correspondingly regulating the level of energy passed to load 21. An adjusting means, depicted as a knob 24, is provided to regulate the output signal from control unit 22 with consequent governing of converter operation to regulate energization of the load.

In a similar manner second energization channel 11 includes another DC-to-DC converter 25 coupled over line 26 to D-C bus 12. Converter 25 need not be of the type which can pass energy in both directions, if no energy is to be regenerated and fed backward in channel 11. However for descriptive purposes converter 25 will be considered as having the capability to pass D-C energy in a first direction over line 27, filter 28, and line 30 to energize load 31, and also to pass energy in the opposite direction from line 27 through the converter and over line 26 back to the D-C bus. It is emphasized that a significant increase in efficiency and operating economy can be realized if only one energization channel includes a two-way DC-to-DC converter. For example if it is known that load 31 will always require a constant energization at a level less than that on D-C bus 12 then DC-to-DC converter 25 can be a one-way converter (or "chopper") which passes energy only in one direction from the D-C bus toward load 31. Excess energy from load 21 could then be fed backward through converter 15 over D-C bus 12 to the input side of converter 25, which has its operation regulated by control unit 32 to pass regulating signals over line 33 as determined by the setting of adjusting unit 34. One-way converters or choppers are now known in this art and to facilitate practice of the invention the details of a two-way DC-to-DC converter, together with its supply over line 16, receipt of regulating signals over line 23 and passage of a regulated output voltage through the filter to a load, will now be explained.

Two-way DC-to-DC converter: FIG. 2

In the illustrated two-way DC-to-DC converter circuit D-C energy is received from battery 14 over conductors 40 and 41 upon the closure of switch 42, and is selectively passed to the filter components 18A, 18B by regulating the time of conduction and non-conduction of semiconductor switch 43 in accordance with gating signals received from control unit 22. Such operation in effect regulates the average voltage which will be provided by the filter to energize load 21.

In more detail the D-C bus conductors 12A, 12B are coupled to the battery conductors 13A, 13B to pass the same energy to the other energization channels supplied from the same source. Accordingly these and other channels can be energized irrespective of the position of switch 42, shown coupled between conductors 13A and 39, which is only actuated to supply energy to the first energization channel in which converter 15 is connected. An input filter capacitor 46 is coupled between conductors 39, 41. A protective fuse 47 is connected between conductors 39 and 40.

SCR 43 has its anode 43a coupled to conductor 40, and its cathode 43c coupled to terminal 48 at one end of commutating choke 50. The commutating choke includes an upper winding 51 connected between the terminal 48 and a center terminal 52, and a lower winding 53 connected between center terminal 52 and another terminal 54. Another SCR 55 is provided with its anode 55a coupled to the terminal 54 and its cathode 55c coupled, through a diode 56, to conductor 41. Diode 56 is provided and connected as illustrated to prevent discharge of commutating capacitor 60 into the load 21 during the commutation interval; thus no load current flows through capacitor 60 to subtract any of the accumulated charge from that capacitor.

A reference conductor 57 is coupled to center terminal 52 of the commutating choke. A first commutating capacitor 58 is coupled between conductors 40 and 57, and another commutating capacitor 60 is coupled between conductor 57 and the common connection between cathode 55c and the anode of diode 56. Those skilled in the art will appreciate that although the capacitors are illustrated as one known means for effecting the "dumping" of energy into the respective windings of the commutating choke to effect the commutation, other suitable arrangements such as an independent power supply can be connected in the circuit positions illustrated for capacitors 58, 60 to accomplish the same end.

A spillover transformer 61 is provided and it includes a primary winding 62 and a secondary winding 63. Primary winding 62 is connected between terminal 52 and another reference terminal 64, and the secondary winding 63 is coupled between terminals 64 and 65. Spill-over diodes 66 and 67 are provided, with diode 66 coupled between conductor 40 and terminal 64, and the other diode 67 coupled between terminal 64 and conductor 41. A first energy return diode 68 is connected between conductor 40 and terminal 65, and the other energy return diode 70 is connected between terminal 65 and conductor 41. A filter capacitor 71 is parallel-coupled with secondary winding 63 of the spillover transformer.

A transient suppression circuit for SCR 43 includes a capacitor 72 coupled in series with resistor 73, and the series circuit is connected between conductor 40 and the common connection between cathode 43c and terminal 48. Another similar suppression circuit comprising series-coupled capacitor 74 and resistor 75 is coupled between conductor 41 and the common connection between terminal 54 and anode 55a.

It is apparent that the single line 23 illustrated in FIG. 1 actually represents four different conductors as shown in FIG. 2. Conductors 23A, 23B apply firing or turn-on signals from control unit 22 between the gate 43g and cathode 43c of SCR 43, and conductors 23C, 22D similarly apply the gating signals between gate 55g and cathode 55c of the other SCR 55. All these signals can be considered as means for regulating the conduction and non-conduction times of SCR 43, because the other SCR 55 is utilized only to commutate or turn off SCR 43 and thus regulate the amount of energy passed through filter 18 to the load 21. Those skilled in the art will appreciate that for this reason SCR 55 can be sized (in an electrical sense) considerable smaller than can SCR 43, for SCR 55 does not handle any of the load current, but only the regenerated current.

In addition to regulating the times at which the control signals are translated over conductors 23A–23D by the adjustment of knob 24, three separate input signals are also received by control unit 22 to assist in regulating the level of the voltage transferred to the load. The voltage applied to output conductors 20A, 20B is sensed at conductors 76, 77 and transferred over cable 78 to the input side of control unit 22. By the connection of a resistor 80 between conductors 41 and 20B a signal is provided over conductors 81, 82 which represents the level of current flowing from the converter through the filter to load 21; this signal is transferred over cable 83 to the input side of control unit 22. In this current-sensing arrangement, resisitor 80 has a value of only a few ohms to avoid a large loss of the energy transferred toward the load. In the event a shorting of the load should occur, the high level of current drawn by the load through resistor 80 provides a signal over cable 83 to control unit 22 which insures that SCR 43 remains non-conducting, preventing any drain on the battery or any other power source until the fault at the load has been remedied.

Considering now the operation of the circuit shown in FIG. 2, energy from battery 14 is passed over conductors 13A, 13B and over the parallel-coupled conductors 12A, 12B which functions as the D.C. bus. Thus energy is always available for any of the parallel-connected energization channels connected to the D-C bus. Upon closure of switch 42, the energy from battery 14 is passed over conductor 39 and fuse 47, and thus is applied between conductors 40 and 41 of the DC-to-DC converter.

Assuming that SCR 43 is gated on by receipt of a gating pulse over conductors 23A, 23B from control unit 22, current flows from the positive terminal of battery 14 over conductor 13A, switch 42, conductor 39, fuse 47, conductor 40, SCR 43, winding 51 of commutating choke 50, conductor 57, choke 18A of the filter 18, conductor 20A to the load 21 and back over conductor 20B and resistor 80 to the other side of battery 14. At a subsequent time a gating or firing pulse is applied over conductors 23C, 23D to SCR 55 to turn this SCR on and turn SCR 43 off in a well known manner. Briefly as SCR 55 is gated on the commutating capacitor 60 dumps the stored energy therein over conductor 57 into winding 53 of the commutating choke 50 and, with the transformer action of the commutating choke, the requisite hold-off voltage is applied across SCR 43 for a time sufficient to turn the SCR off and hold it off, to insure that only SCR 55 is left conducting. Thus it is apparent that none of the load current actually flows through SCR 55 but this semiconductor unit only handles the commutating energy and regenerated energy; thus SCR 55 can be sized, in an electrical sense, at much lower levels than the main power transfer switch 43. For those desiring a more extensive description of an inverter arrangement utilizing a commutating choke, and the spillover transformer such as transformer 61, such a complete description is found in Pat. No. 3,349,315-Studtmann which issued Oct. 24, 1967 and is assigned to the assignee of this invention. Because of that full and complete description no further reference need be made to the operation of the components depicted in FIG. 2.

Motor control channels: FIG. 3

FIG. 3 depicts another embodiment of the system of the present invention in which the D-C bus 12 is energized from a rectifier 90 which in turn receives A-C energy over an input line 91. The D-C output voltage from filter 18 is passed over line 92 to an inverter 93, which in turn passes an alternating voltage over conductor 94 to energize an A-C motor 95 in a well known manner. The operating frequency of the inverter is determined by an oscillator 96 which has an adjustable knob 97 for regulating the frequency of the control signals passed over line 98 to the inverter, correspondingly to regulate the frequency of the A-C output voltage passed over conductor 94 to energize the motor. In those systems wherein it is desired to maintain constant the ratio of voltage amplitude to the frequency of the A-C voltage supplied to the motor, a volts-per-cycle regulator 100 is provided and is connected, over line 101, to receive a sample of the energy actually passed to the motor 95. This sample is contrasted with the desired ratio as determined by the setting of knob 102 on the regulator 100, and any deviation of the actual energy from the desired volts-per-cycle ratio produces a control signal which is passed over line 103 to regulate operation of converter 15, by regulating the on and off time of SCR 43, to produce the requisite level of voltage to the inverter to balance against the frequency supplied by oscillator 96 and provide the desired volts-per-cycle ratio.

In a parallel-coupled channel, energy is supplied from filter 28 over line 104, inverter 105, and line 106 to another A-C motor 107. Another oscillator 108 includes an adjusting knob 110 to determine the frequency of the control signals passed over line 111 to the inverter. The actual volts-per-cycle ratio of the energy passed to the motor is sensed over line 112 to provide a control signal to the volts-per-cycle regulator 113 which is contrasted against the setting determined by knob 114. A control signal from regulator 113 is provided over line 115 to the DC-to-DC converter 25 to regulate the amplitude of the voltage provided to inverter 105 and maintain the desired volts-per-cycle ratio of the energy supplied to motor 107.

A volts-per-cycle regulator of any suitable type can be provided. One eminently suitable form is that illustrated in FIG. 3, and in more detail in FIGS. 4a and 4b of Pat. No. 3,351,835-Borden et al., which issued Nov. 7, 1967 and is assigned to the assignee of this invention. Likewise the inverter can be of many different types. By way of example the converter circuit shown in FIG. 2 can be operated as an inverter by driving the other SCR 55 as a load-sharing switch which is utilized to pass load current during its conductive portion of the operating cycle, rather than being used as in a converter only to commutate the other SCR 43. Those skilled in the art will appreciate these different variations of the basic system in accordance with the principles described above in connection with FIG. 1.

Although only particular embodiments of the invention have been described and illustrated, it will be apparent to those skilled in the art that various changes and modifications may be made therein without departing from the invention in its broader aspects. Therefore the aim in the appended claims is to cover all such changes and modifications as may fall within the true spirit and scope of the invention.

What is claimed is:

1. In a system for energizing a plurality of A-C motors through respective parallel-coupled energization channels, the combination of:

a common D-C supply bus;

means for supplying D-C energy to said D-C bus;

a first energization channel, including a first DC-to-DC converter coupled to said D-C bus and connected to pass D-C energy in either direction, a first filter coupled to said first DC-to-DC converter, a first inverter connected to pass D-C energy in either direction and coupled between said first filter and a first one of said A-C motors, an oscillator including an adjustable component coupled to said first inverter for regulating the frequency of the A-C voltage passed to the first A-C motor, and a volts-per-cycle regulator, having adjusting means for presetting the desired volts-per-cycle ratio of energy passed to the first A-C motor, connected to regulate operation of said first DC-to-DC converter and correspondingly regulate the level of the voltage passed to the first A-C motor; and a second energization channel, including a second DC-to-DC converter coupled to said D-C bus, a second filter coupled to said second DC-to-DC converter, a second inverter coupled between said second filter and a second one of said A-C motors, means coupled to said second inverter for regulating the frequency of the A-C voltage passed to the second A-C motor, and a second control unit connected to regulate operation of said second DC-to-DC converter and correspondingly regulate the level of the voltage passed to the second A-C motor.

2. An energization system as claimed in claim 1 in which said means coupled to the second inverter is a second oscillator which includes an adjustable component for regulating the frequency of the second oscillator output signal and correspondingly regulating the frequency of the A-C voltage provided by said second inverter, and said second control unit is another volts-per-cycle regulator having adjusting means for presetting the desired volts-per-cycle ratio of energy passed to the second A-C motor.

References Cited

UNITED STATES PATENTS

| | | | |
|---|---|---|---|
| 2,742,580 | 4/1956 | Holdt | 307—82 |
| 3,178,624 | 4/1965 | Borden | 318—231 X |
| 3,311,809 | 3/1967 | Corey et al. | 321—45 |
| 3,365,638 | 1/1968 | Risberg | 318—231 X |
| 3,403,318 | 9/1968 | Krauthamer et al. | 321—18 X |
| 3,434,030 | 3/1969 | Bedford | 321—2 |
| 3,439,242 | 4/1969 | Gasser | 318—231 X |
| 3,453,524 | 7/1969 | Dinger | 318—231 X |

WILLIAM H. BEHA, JR., Primary Examiner

U.S. Cl. X.R.

307—82; 318—227; 321—2, 27